United States Patent [19]

Stähli

[11] 4,147,926
[45] Apr. 3, 1979

[54] ELECTRICAL HEATABLE MUFF AND PROCESS FOR ITS MANUFACTURE

[75] Inventor: Paul Stähli, Jona, Switzerland

[73] Assignee: Geberit AG, Jona, Switzerland

[21] Appl. No.: 750,764

[22] Filed: Dec. 15, 1976

[30] Foreign Application Priority Data

Dec. 18, 1975 [CH] Switzerland ............... 16416/75

[51] Int. Cl.² ............................................. H05B 3/58
[52] U.S. Cl. .................................. 219/535; 219/544; 219/522; 285/22; 285/286; 264/272
[58] Field of Search .............. 219/535, 544, 522; 285/21, 22, 260, 423; 264/272; 156/275

[56] References Cited

U.S. PATENT DOCUMENTS

| | | | |
|---|---|---|---|
| 1,980,561 | 11/1934 | Wagner | 285/22 |
| 3,062,940 | 11/1962 | Bauer et al. | 219/535 X |
| 3,062,940 | 11/1962 | Bauer et al. | 219/544 |
| 3,179,445 | 4/1965 | Moretti | 285/423 X |
| 3,208,757 | 9/1965 | Jageman | 285/260 |
| 3,563,574 | 2/1971 | Jackson | 285/423 |
| 3,792,878 | 2/1974 | Freeman | 285/423 |
| 3,797,865 | 3/1974 | Ballentine | 285/260 |
| 3,943,334 | 3/1976 | Sturm | 219/535 |
| 3,943,334 | 3/1976 | Sturm | 219/544 |
| 3,987,276 | 10/1976 | Vogelsanger | 219/535 |
| 3,987,276 | 10/1976 | Vogelsanger et al. | 219/535 |

FOREIGN PATENT DOCUMENTS

| | | | |
|---|---|---|---|
| 1960466 | 6/1971 | Fed. Rep. of Germany | 285/423 |
| 1416207 | 11/1964 | France | 285/21 |

*Primary Examiner*—J. V. Truhe
*Assistant Examiner*—M. Paschall
*Attorney, Agent, or Firm*—Pollock, Vande Sande & Priddy

[57] ABSTRACT

An electrically heatable welding muff for connecting plastic pipes has a heating wire winding disposed in a helical groove in its interior wall. To position the pipes to be connected snugly and accurately, longitudinal grooves are cut in the interior wall of the muff so that the material forced out of the grooves projects inwardly, forming resilient retaining tabs.

4 Claims, 2 Drawing Figures

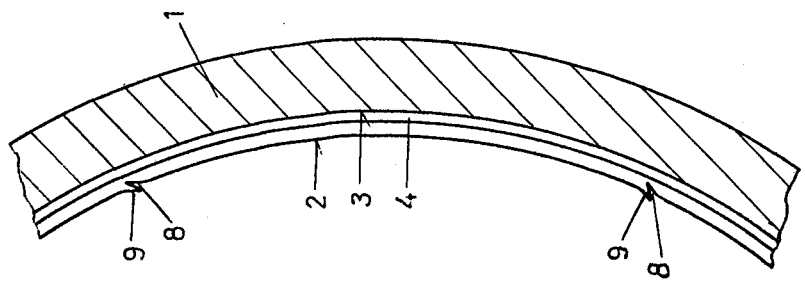
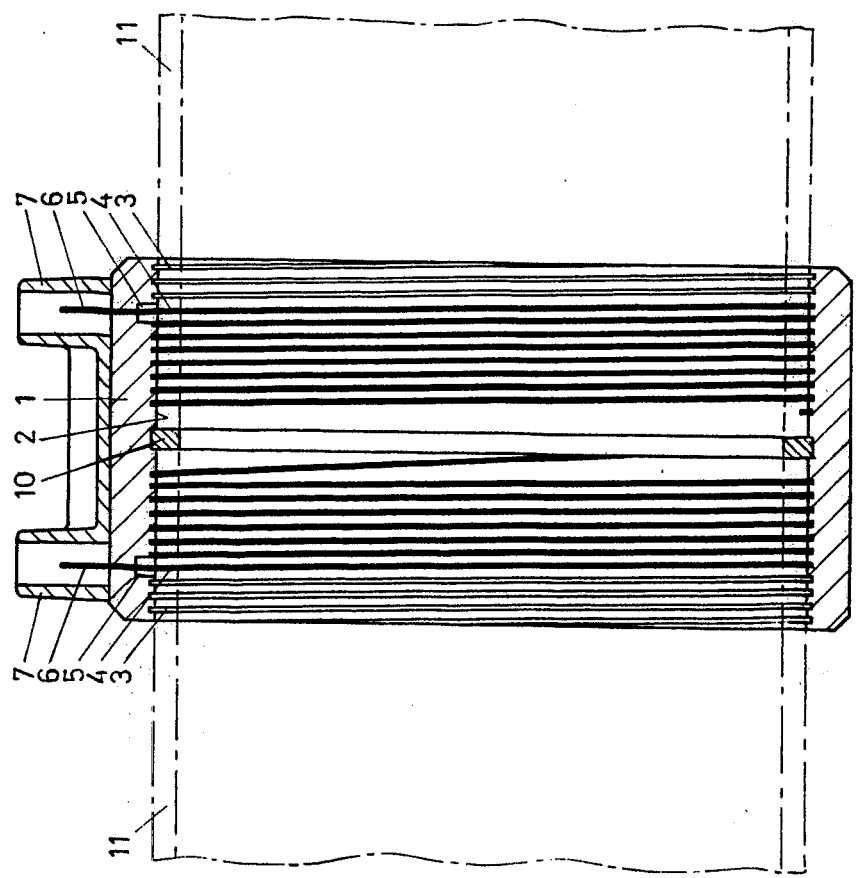

ELECTRICAL HEATABLE MUFF AND PROCESS FOR ITS MANUFACTURE

The invention relates to an electrically heatable welding muff of thermoplastic material for connecting plastic pipes with heating wire winding contained in the muff, the ends of the winding being led to the exterior for connection to a current source.

There are relatively large differences in tolerances due to manufacture between the plastic pipes and the muffs intended to connect them. If the tolerances are kept too close, it can happen that individual pipes are insertable into the muff only by force, e.g., through pounding, which is undesirable. If the tolerances are too great, the pipes are not centered in the muff and can easily cant, which causes bad welding connections. Also, in assembling the pipe system, it would be advantageous if the pipes, prior to welding, were seated snugly in the muffs and were held in precise alignment by the latter. It is the object of the invention to produce a welding muff of the type first described in which the disadvantages of known muffs are avoided and which meets the stated requirements.

According to the invention, this is achieved by providing resilient projections on the interior wall of the muff to assure a tight seat for the pipes insertable in the muff prior to welding.

According to a preferred embodiment of the welding muff, the projections comprise tabs extending in axial direction and arranged at equal distances from one another on the interior wall.

The invention further relates to a method of manufacturing the welding muff, characterized according to the invention in that longitudinal grooves are cut in the interior wall in such manner that the material forced out of the grooves forms the inwardly projecting tabs.

An embodiment of a welding muff will now be described in more detail with reference to the drawing, wherein:

FIG. 1 shows a longitudinal section through a welding muff, and

FIG. 2 shows a radial section through the wall of the welding muff, in larger scale.

The electrically heatable welding muff shown in FIG. 1 has a cylindrical body 1 of thermoplastic material, e.g., polyethylene. The interior wall 2 of the body is provided with a helical groove 3 into which the winding 4 of a heating wire is placed. The ends of the heating wire are led to the exterior through two radial bores 5 and connected with two contact pieces 6 anchored in the body and shielded by two sleeves 7.

The muff is manufactured with relatively close tolerances. On the other hand, the plastic pipes, which are usually produced by extrusion, have relatively large differences in diameter. This makes it difficult to press the muff on the ends of the pipe if the fit is too tight, and causes too loose a connection prior to welding if the fit is too loose. Thereby the assembly of individual pipes into a pipe system is made more difficult; the pipes are not centered in the muff, and the weld is irregular. To prevent this, longitudinal grooves 8 are cut in the interior wall 2 of the muff body 1 in such manner that the material forced out of the grooves projects inwardly and forms longitudinal tabs 9. The depth of the groove 8 is obviously so selected that the resistance wire 4 placed in the grooves 3 is not damaged. The grooves 8 are appropriately so formed that the tabs 9 are arranged at equal distances on the interior wall.

By means of these tabs, the tubes 11 inserted into the muff on both sides up to stop ring 10 are retained snugly and in precisely centered position. The distance of the pipes from the interior wall of the muff is the same, which provides a better welding connection. Experiments have shown that the tabs are sufficiently resilient to produce a firmly retained connection even after repeated mounting of the muff.

To produce the indissoluble connection, the muff is heated in known manner by the heating wire, causing the same to contract and the interior wall to fuse the pipe ends.

As a control for the correctly completed weld it is desirable to attach a heat indicator to the muff. This indicator, known per se, made for example of paper or plastic, is preferably glued in easily visible position adjacent to the sleeves on the muff. On the basis of the permanent discoloration of the indicator after welding of the muff, it can be determined whether the correct welding temperature has been reached.

Since during the assembly of pipe systems the individual pipe pieces and muffs are usually first placed together loosely, for subsequent welding in groups, it can be determined by means of the indicator which connections are already welded and which remain to be welded. In this manner, undesirable double welds can be avoided, and it is immediately visible whether a weld has been omitted or not. The color indicator can, for example, have a white dot which darkens as the temperature rises and turns black when the final temperature of 240° to 250° is reached.

I claim:

1. Electrically heatable welding muff of thermoplastic material for exteriorly connecting plastic pipes, said muff comprising
   (a) a heating wire winding disposed in its interior wall, the ends of said winding being led outwardly for connection to a current source; and
   (b) resilient tabs projecting from said interior wall for spring-like engagement of said pipes to be inserted in said muff, to assure a snug seat for said pipes prior to welding, said resilient projections being formed of material forced out of a groove cut in said interior wall of said muff.

2. Welding muff according to claim 1, wherein the projections comprise tabs extending in axial direction and arranged on the interior wall at equal distances from one another.

3. Welding muff according to claim 1, including a heat indicator arranged on the muff and subject to discoloration as the temperature increases.

4. Welding muff according to claim 1, including longitudinal grooves on the interior wall, the projections being comprised of material forced out of the grooves.

* * * * *